Jan. 1, 1924.
L. E. WATERMAN
POLE TRUCK AND STEERING DEVICE
Filed June 9, 1919   2 Sheets-Sheet 1
1,479,570
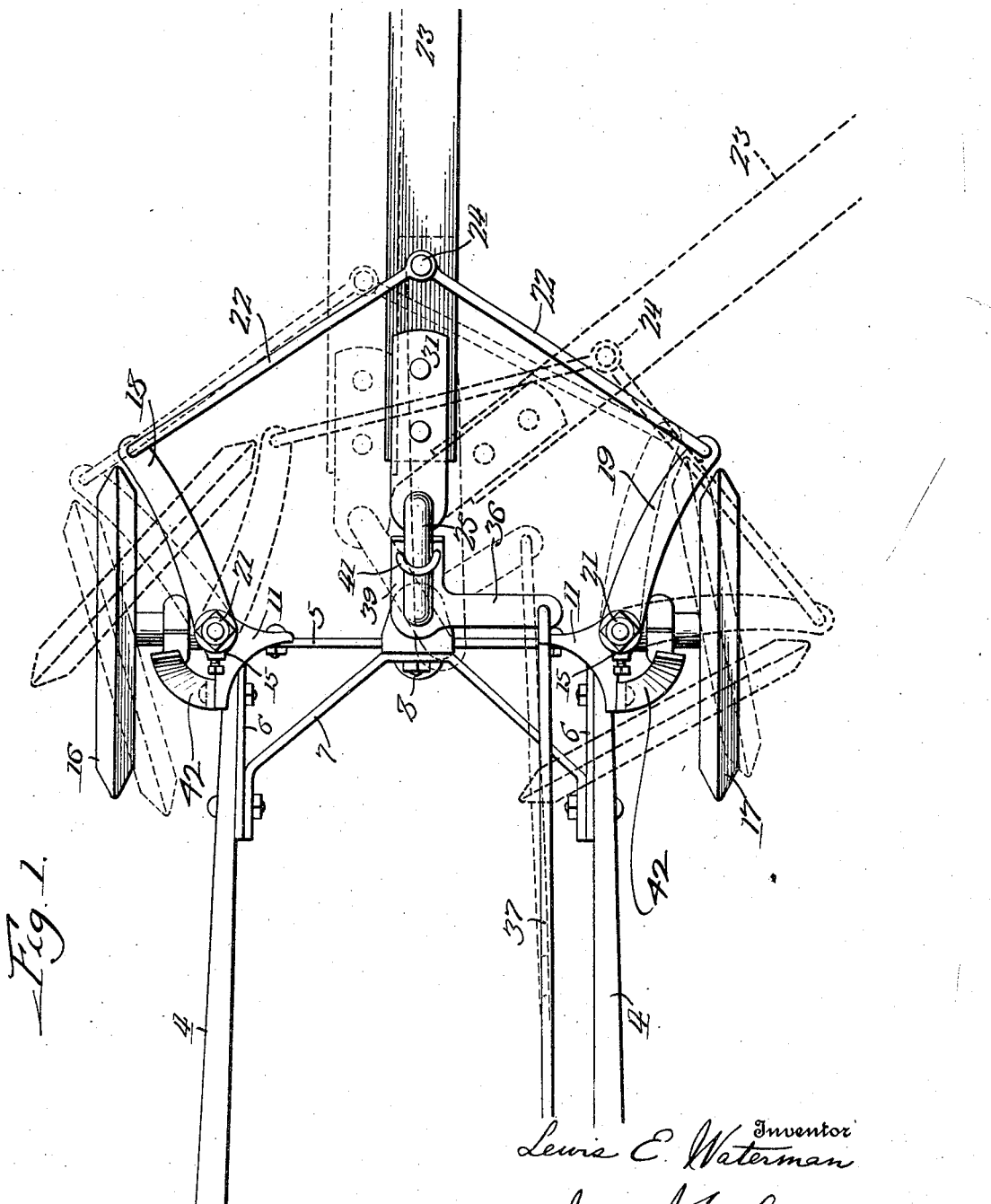

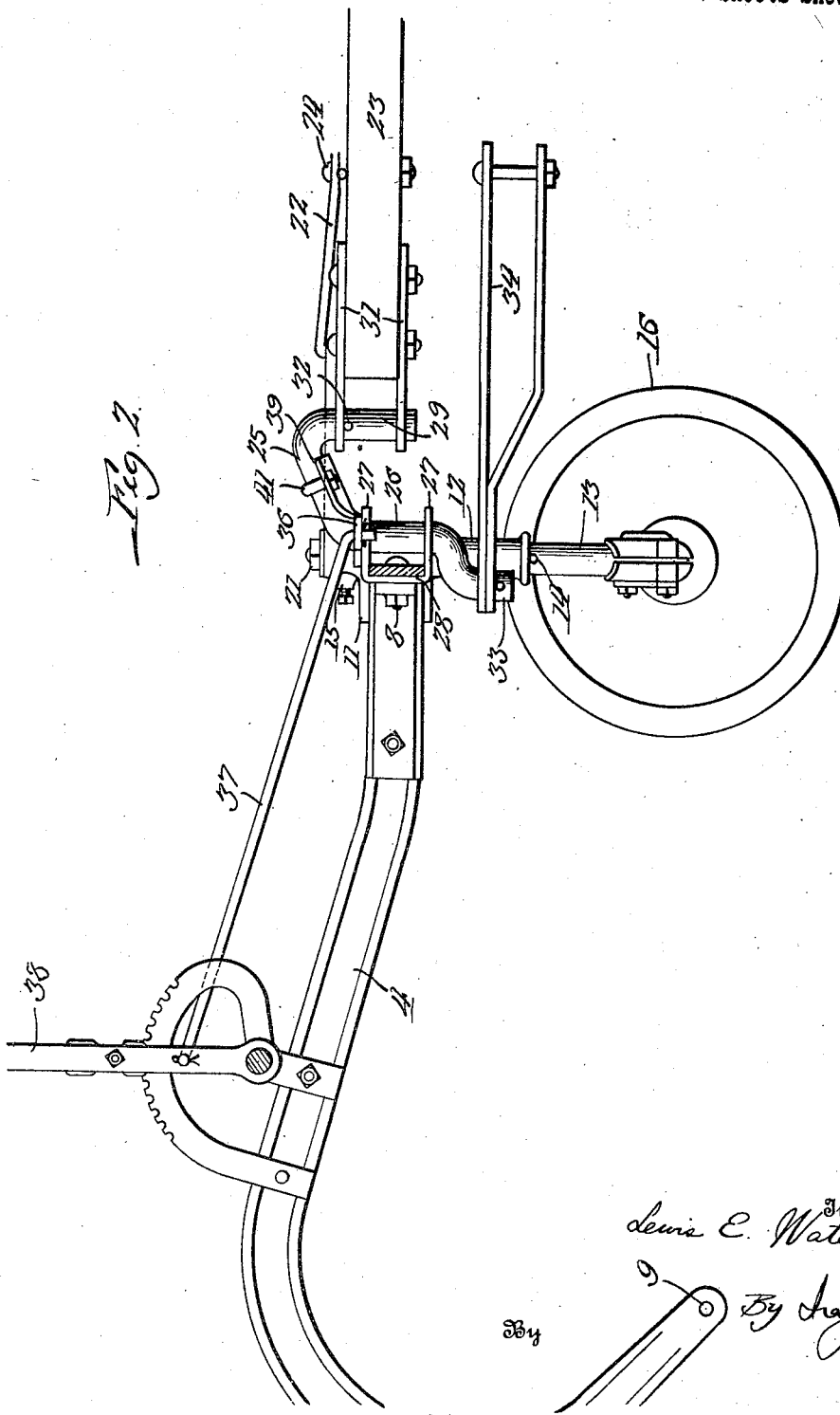

Patented Jan. 1, 1924.

1,479,570

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

POLE TRUCK AND STEERING DEVICE.

Application filed June 9, 1919. Serial No. 302,661.

*To all whom it may concern:*

Be it known that I, LEWIS E. WATERMAN, a citizen of the United States, residing at Rockford, in the county of Winnebago and State of Illinois, have invented certain new and useful Improvements in Pole Trucks and Steering Devices, of which the following is a specification.

This invention relates in general to horse-drawn farm implements, and has more particular reference to the front wheel and pole structures thereof, the present example of my improvements being specially adapted for implements known as machine potato diggers, although equally well adapted for various other implements, as will readily appear hereinafter.

A machine potato digger must be turned about at the end of each row, and instead of the fifth wheel mounting for the front wheels, it has been found practical to provide a pole truck or front frame structure having pivot wheels connected with the pole so that the wheels are held in parallel relation with the pole and steered thereby. In turning about, however, with a construction of this character, the front wheels are not turned to the proper angle, and consequently, are dragged or skidded sidewise over the ground.

One of the objects of the present invention is to provide a construction of the character described in which the wheels will be steered by the pole and properly angled when the implement is turned about so as not to drag or skid. This result is attained by a peculiar connection between the wheels and pole by which the wheels, although held in parallel relation with the pole during straight ahead traveling and ordinary dodging, are not angled parallel when the pole is swung around for turning; but instead, are moved to a position tangential to the pivot axis of the rear inner wheel of the implement. In this position, the front wheels travel in true arcs and there is no sidewise skidding or dragging of the wheels.

Another object is to provide means for angling the wheels at will independently of the pole when working on a side hill. The purpose of this is to position the wheels with a lead up hill to resist the tendency of the implement to drift down hill. I have also aimed to further prevent downhill drifting of the implement by shifting the point of draft laterally in a direction opposite to the lead of the wheels simultaneously with angling of the same, so that the draft assists in keeping the implement in line with the rows.

A further object is to provide improved means for quickly and conveniently angling the wheels and shifting the draft when working on side hills, such adjustment in no way disturbing the steering connection between the wheels and the pole.

With the foregoing objects in mind, I have also aimed to provide a construction which is simple and thoroughly practical for the purposes for which it is designed, and which consists of but relatively few parts capable of being manufactured at a comparatively low cost.

Other objects and attendant advantages will be readily appreciated as the invention becomes better understood by reference to the following description when considered in connection with the accompanying drawings, in which—

Figure 1 is a plan view of the front end of an implement embodying my improvements and indicating in heavy and light dotted lines two different positions of the wheels; and Fig. 2 is a longitudinal sectional view through Fig. 1.

In the present instance, I have illustrated my improvements in connection with a front frame structure or pole support, such as is commonly employed in machine potato diggers. It will be understood, however, that my improvements are not limited to this particular use, but are generally applicable to various kinds of farming implements and vehicles, in which it is desired to guide the front pivot wheels in the manner contemplated by this invention.

Referring to the drawings, the front frame structure takes the form of laterally spaced beams rigidly joined together at their forward ends by an interposed front bar 5 having ends 6 turned back and bolted to the beams by a suitable bracing bar 7 medially secured by a bolt 8 to the front bar 5 and bolted at its ends to the beams. The beams are pivotally connected at their rear and lowermost ends 9 to the front end of the main frame, which carries the plow and elevator, which frame is not shown in the present instance, because it has no bearing on the invention in mind. The beam frame structure is wheel supported at its forward end, and because it carries the pole or tongue it is generally referred to as a pole truck.

Secured to the front corner of the pole truck is a bracket 11 shaped to provide a spindle bearing 12 in which is journaled for rotative movement, a spindle 13 turned outwardly at its lower end to provide an axle on which a supporting wheel is mounted. The bearing brackets 12 rest at their lower ends on suitable abutments fixed to the spindles, such as pins 14, and relative displacement between the brackets and spindles in the opposite direction is prevented by collars 15 secured to the spindles at the upper ends of the brackets. The spindles are oscillated to turn the wheels 16 and 17 through the agency of arms 18 and 19 secured respectively to the upper ends of the spindles of the wheels. In this case, the arms 18 have square sockets fitting on the squared upper ends of the spindles, and nuts 21 threaded on the reduced ends of the spindles securing the arms thereto. Viewing Fig. 1, it will be noted that the arms 18 and 19 diverge forwardly and terminate at points forward and at the outer side of the spindles 13. These arms are respectively connected at their forward ends by means of links 22, to the pole or tongue 23 at a point 24 thereon.

A unique means is provided for pivotally connecting the pole to the frame to allow for lateral adjustment at will of the pole pivot relatively to the frame. This consists, preferably of a forged rod designated generally by 25, having a vertical portion 26 pivotally mounted in the forwardly directed ears 27 of a bracket 28 secured by means of the bolt 8 to the frame, as clearly shown in Fig. 2. The upper end of this rod is bent forwardly and upwardly and then turned downwardly forming an upright pole attaching portion 29 to which the pole 23 is connected by means of cleats 31. A pin 32 through the pole pivot 29 holds the pole against displacement. The lower end of the rod is bent rearwardly and then downwardly forming an upright portion 33 to which a draft member or bar 34 is pivotally attached and held against displacement by a suitable locking pin. It will be readily seen that this construction provides in reality a pivoted member having forwardly and rearwardly directed crank arms to which are respectively connected a pole and a draft member. Any suitable draft means may be attached to the member 34.

Means is now provided for holding the member 24 in a set position against rotative movement and for adjusting this member at will to angle the wheels for a purpose presently to be described. Such means may be of suitable construction, and in the present case, is in the form of an arm 36 secured to and extending laterally from the pivot portion 26 of the rod 25 and connected at its outer end by means of a link 37 to a hand lever 38 mounted on the front frame structure and having the usual latch connection with a notched segment so that the lever may be held in any adjusted position. In order to secure the arm 36 rigidly to the member 25 in a simple manner, the arm is provided with a forward extension 39 fitting the underside of said rod 25 and is secured thereto by a U-bolt 41, as shown. The arm plate 36 thus provides a bearing against the upper ear 27 of the bracket 28 for preventing the upper crank portion of the arm 25 from binding in said bracket. Suitable stops 42 are provided for limiting the swinging movement of the arms 18 and 19 beyond certain positions as will be presently described.

When an implement equipped with my improvements is drawn straight ahead, the front wheels and pole are in the position shown in full lines in Fig. 1. The wheels are thus held in parallel relation to the pole by means of the arms 18 and 19 and the links 22, the adjustable pole pivot member 25 being locked in position by the latch on the lever 38. During ordinary dodging and lateral swinging movement of the pole, the wheels are angled by and with the pole in substantially parallel relation thereto. When, however, the implement is turned about as when the end of a row is reached, the pole is swung laterally substantially at right angles to the longitudinal axis of the machine. By moving the pole to this position, the wheels 16 and 17 will be swung to a relatively nonparallel position with respect to each other and with respect to the pole as distinguished from their parallel relation when the machine is traveling straight ahead. In other words, the wheels are moved to positions tangential to the pivot axis of the inner rear wheel about which the machine pivots when being turned around. Thus, the wheels turn in true circles and do not have to be dragged or skidded sidewise as is the case when the wheels are simply angled in parallel relation to each other and to the pole and are angled to the requisite positions for turning, as in constructions previously provided. In Fig. 1, I have illustrated in heavy dotted lines the position the wheels assume when the pole has been swung to the right, although not as far as when turning completely around. In this heavy dotted line position it will be noted that the wheels are non-parallel by reason of the peculiar connection between the spindles and the pole, which causes the arm 19 to be swung through a greater arc than the arm 18 when the pole is swung to the right, and vice versa, when the pole is swung to the left. The stops 42 are designed to limit the extreme movement of the arms 18 and 19 and consequently of the pole when the latter is swung to either side. It will be manifest that when the pole is swung fully around for turning the implement about, the non-parallel relation of the front wheels will be still greater than is shown in the heavy dotted line position illustrated.

Implements of this character are frequently used on side hills where there is the always present tendency of the implement to drift down hill. In order to hold the machine in the row or to follow a given line, I have provided means for angling the front wheels to give them a lead up hill without interfering with the position of the pole. This is done by operating the hand lever 38, which, when moved forwardly from its full line position, will swing the pole pivot rod 25 about its pivot 26 in a counter-clockwise direction, viewing Fig. 1, and angle the wheels to the left without disturbing the forward end of the pole, which as is manifest, is carried by the horses and held in alignment with the machine. This adjusted position is indicated by the light dotted lines, it being noted that the front wheels are angled toward the left in parallel relation, giving the wheels the desired lead up hill. At the same time, the line of draft has been shifted in the opposite direction so that the draft also is utilized in resisting the down hill side thrust of the machine. Thus, by a simple adjustment of the lever 38, an effectual means is provided for holding a machine of this character in alignment with the rows and the steering function of the pole is not disturbed.

It is believed that the foregoing conveys a clear understanding of the objects prefaced above, and it should be understood that while I have illustrated one practical embodiment of my improvements, various changes might be made in the construction and arrangement without departing from the spirit and scope of the invention as expressed in the appended claims.

I claim:

1. The combination of a frame, steering wheels therefor, a pole, a draft member pivotally connected to the frame and to the pole at longitudinally spaced points, means connecting the wheels to the pole for steering, and means for adjusting said draft member about its pivotal connection with the frame to give the wheels an up-hill lead without swinging the forward end of the pole laterally.

2. The combination of a frame, a pole supporting member pivotally mounted on the frame to swing laterally, a pole mounted on said member forward of its pivoted connection with the frame, a draft member pivotally connected to said pole supporting member at the rear of its said pivotal connection with the frame, and means for adjusting the pole-supporting member laterally about its pivot.

3. The combination of a frame, a rod pivotally mounted intermediate its ends on the frame on an upright axis, the upper and lower ends of the rod being bent forwardly and rearwardly, respectively, and then to upright positions, a pole pivotally connected to the upright portion of the upper end of the rod, a draft member pivotally connected to the upright portion of said lower end, and means for holding the rod in adjusted position against lateral swinging movement.

4. The combination of a frame, a rod pivotally mounted intermediate its ends on the frame on an upright axis, the upper end of the rod being bent forwardly and then to an upright position, a pole pivotally connected to the upright portion of said upper end, a draft member connected to the rod, and means for adjusting the rod to swing its forward upright portion laterally.

5. A pole truck comprising a frame, supporting wheels each connected to the frame to turn about an upright axis, a pole connected at its rear end to the frame on a laterally adjustable connection and capable of lateral swinging movement about a pivot on said connection, means connecting the wheels with the pole for steering the former by the latter, and means for adjusting said connection laterally.

6. A pole truck comprising a frame, supporting wheels each connected to the frame to turn about an upright axis, a combined draft and pole supporting member pivotally mounted on the frame, a pole and a draft member independently pivotally connected to said supporting member in such relative relation that when said supporting member is turned about its axis the pole and draft member will be swung laterally in opposite directions, and means operated by the pole for steering said wheels.

LEWIS E. WATERMAN.